J. MEYER.
ANIMAL TRAP.
APPLICATION FILED JAN. 31, 1910.
979,020.
Patented Dec. 20, 1910.
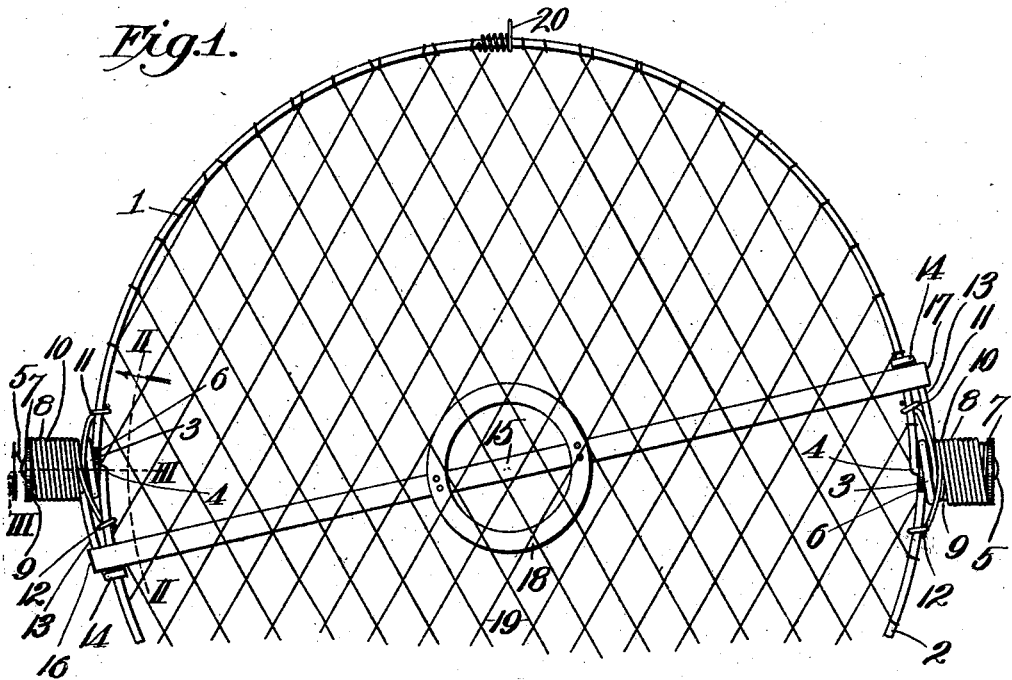
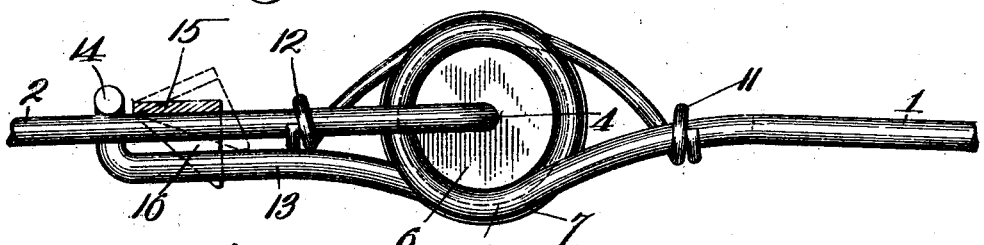
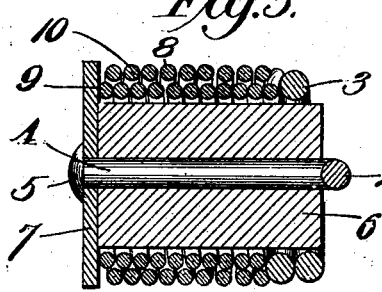
Witnesses
Frank R Glow
H. C. Rodgers
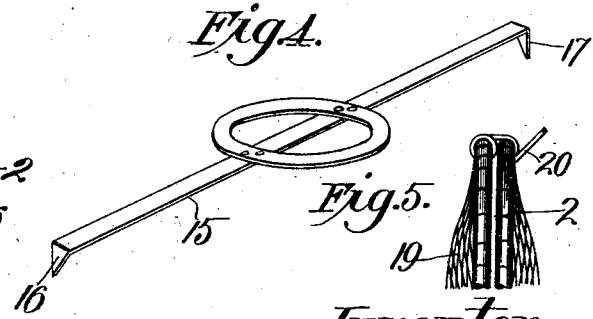
Inventor
John Meyer
By George J Thorpe Atty.

UNITED STATES PATENT OFFICE.

JOHN MEYER, OF ELLINWOOD, KANSAS.

ANIMAL-TRAP.

979,020.  Specification of Letters Patent.  Patented Dec. 20, 1910.

Application filed January 31, 1910. Serial No. 541,194.

*To all whom it may concern:*

Be it known that I, JOHN MEYER, a citizen of the United States, residing at Ellinwood, in the county of Barton and State of Kansas, have invented certain new and useful Improvements in Animal-Traps, of which the following is a specification.

This invention relates to animal traps of that class adapted to be tripped by an animal in an attempt to remove the bait, and my object is to produce a trap of this character provided with a flexible body to incase the animal without injury when the trap closes, a further object being to produce a simple, strong, durable and cheap trap which will operate efficiently and reliably.

With these objects in view, the invention consists in certain novel and peculiar features of construction and organization as hereinafter described and claimed; and in order that it may be fully understood reference is to be had to the accompanying drawing, in which;

Figure 1, is a top plan view of a trap, broken away embodying my invention. Fig. 2, is an enlarged vertical section on the line II—II of Fig. 1. Fig. 3, is an enlarged section on the line III—III of Fig. 1. Fig. 4, is a perspective view on a reduced scale of the tripping device. Fig. 5, is an edge view of part of the trap in its closed position, to show the catch for holding it closed to prevent the escape of a captured animal.

In the said drawing, 1 and 2 indicate substantially semi-circular rods of resilient material, the rods, when the trap is opened as shown, being oppositely-bowed so as to conjointly form a substantially circular frame, and in the preferred construction each rod at one end is provided with a coil or convolution 3, and at the other end with an outwardly-projecting arm 4, disposed axially with respect to said convolution, and the outer end of said arm is upset to form a head as at 5. The rods are arranged with the arm 4 of one extending centrally through the convolution 3 of the other. From the foregoing it will be understood that the rods 1 and 2 are exact duplicates, it being of course understood that one rod may be provided with two convolutions and the other rod with two outwardly-projecting arms. The first-named construction is preferred, however, as calling for but a single type of rod so that in the event of one rod becoming injured, it can be replaced without the necessity of making a particular kind of rod as would be the case if one rod were provided with the convolutions and the other with the outwardly-projecting arms.

Mounted upon the outwardly-projecting arms 4 between the semicircular body-portions and the headed ends 5, are what may be termed spools, and, in the preferred construction, each spool consists of a cylindrical body 6, and a washer 7, the latter being at the outer end of the cylindrical body and of greater diameter than the same. Preferably the washers will be in the form of separate disks though they may in practice be simply enlarged ends or flanges of the cylindrical bodies, and the latter are of size to fit snugly within the convolutions 3, which cannot slip off the inner ends of the said bodies because the tendency of the ends of the spring rods is to move outwardly, and furthermore because one of the spools abuts at its inner end against the adjacent end of rod 1 and the other spool abuts at its inner end against the adjacent end of rod 2, in the preferred construction, as shown.

8 are coiled hinge-springs encircling the bodies of the spools between their flanged or outer ends and the convolutions 3 and in order to obtain the requisite strength without employing wire of heavy gage, the spring-hinges each consists by preference of an inner coil 9 and an outer coil 10, the terminals of the inner coils being shown as fastened at 11 to rod 1 and the terminals of the outer coils at 12 to rod 2. The ends of the rods, provided with the convolutions 3 preferably extend in opposite directions from the spools, as arms 13, and terminate in upwardly-disposed hooks 14. The terminals of the hooks project inward of the frames constituted by the two semicircular rods so that when sprung inward, they shall overlap the adjacent parts of said frame to counteract the effect of the hinge-springs and prevent the closing of the trap, and it will be understood that the arms 13 unless held in the compressed relation described, will spring back and permit the trap to close, that is, permit the rods 1 and 2, to swing upward into substantially parallel relation as shown in Fig. 5, under the force of springs 8.

For the purpose of holding the trap in its opened position, I provide a trip-bar 15, the same being of length to extend diametrically over the circular frame and overlie the arms 13, the ends of said bar 15 terminating in downturned ends 16 and 17 to engage the outer sides of the spring-arms 13. The down-turned ends 16 and 17 are preferably of inverted right-angle-triangle form with their hypotenuse edges facing in opposite directions for a purpose which hereinafter appears. This trip-bar, as will be understood, holds the arms 13 against outward movement and the hooks of the latter over the adjacent parts of the rods 1 and 2 for the purpose stated.

18 is a ring secured centrally upon trip-bar 15, the parts of the ring at opposite sides of the bar forming in effect, levers which will yield under weight imposed upon them by an animal and thus turn or tilt the bar as indicated in Fig. 2, until either of its ends 16 or 17 is raised above the plane of the adjacent arm 13, to permit the latter to spring outward and withdraw its hook 14 from engagement with the adjacent rod.

It will be apparent by reference to Fig. 2, that if the bar 15 tilts as shown by the dotted lines, said figure, less movement is needed to withdraw the down-turned end 16 from the path of outward movement of the adjacent arm 13, than would be required if said end 16 was not of right-angle-triangle form, it being obvious that the end 17 in said tilting movement, will still be at the outer side of the arm 13 adjacent to it, but that the end 16 being withdrawn the trap will close anyway. Conversely if the bar 15 tilts in the opposite direction, end 17 will be withdrawn from the path of outward movement of the adjacent arm 13, and permit the trap to close. It will thus be seen that the tripping of the trap is facilitated by providing the trip-bar 15 with reversely arranged right-angle-triangle down-turned ends.

The body of the trap consists preferably of a netting 19 of any suitable material stretched over trip bar 15 and attached to the semicircular rods. For certain game, the netting may be of braided cord. For other animals, it will be necessary that the body be made of flexible wire so that the animal cannot tear it and escape, and it will also be apparent that there must be sufficient slack in the body to permit the rods of the trap to close together as indicated in Fig. 5. One of the rods will be provided with a snap hook 20, to automatically engage the other and hold the trap in closed condition so that the animal cannot escape.

The trap will be baited preferably within the ring, 18, so that an animal will be likely in attempting to reach the bait, to step upon the ring 18, at one side or the other of the trip-bar and thus spring the trap.

From the above description it will be apparent that I have produced an animal trap possessing the features of advantage enumerated as desirable and which obviously may be modified in minor particulars without departing from the spirit and scope of the appended claims.

Having thus described the invention what I claim as new and desire to secure by Letters-Patent, is:

1. An animal trap, comprising a pair of substantially semicircular rods hinged together at their ends and adapted to be swung together or apart, yielding means tending to cause said rods to swing together, and arms provided with hooks capable of being sprung over the adjacent rods to prevent them from swinging together; said arms each forming a spring terminal for one of said rods and the trip bar to hold said hooks in engagement with the said rods.

2. An animal trap, comprising a pair of substantially semicircular rods arranged with their ends adjacent and each having a convolution at one end and an outwardly-projecting arm at the other, the arm of one extending centrally through the convolution of the other, oppositely-projecting terminal-arms for said convolutions, provided with inturned hooks at their free ends, and diametrically-opposite spring hinges at the outer sides of said rods and encircling the outwardly-projecting arms, with their ends projecting in opposite directions and secured to the adjacent semicircular rods and the trip bar to hold said hooks in engagement with the said rods.

3. An animal trap, comprising a pair of substantially semicircular rods arranged with their ends adjacent and each having a convolution at one end and an outwardly-projecting arm at the other, the arm of one extending centrally through the convolution of the other, spools mounted on said outwardly-projecting arms and fitting at their inner ends in said convolutions, and coiled hinge-springs mounted on said spools outward of said convolutions, the ends of said springs extending in opposite directions and being secured to said semicircular rods to swing the same together when unresisted.

4. An animal trap, comprising a pair of substantially semicircular rods hinged together at their ends and adapted to swing together or apart, yielding means tending to cause said rods to swing together, arms at the outer sides of said rods, provided at their free ends with hooks to overlap adjacent rods, and a trip-bar adapted to bridge the trap and provided with downturned ends to engage the outer sides of said arms and hold them pressed inward with their hook terminals overlying said adjacent rods.

5. An animal trap, comprising a pair of substantially semicircular rods hinged together at their ends and adapted to swing together or apart, yielding means tending to cause said rods to swing together, arms at the outer sides of said rods, provided at their free ends with hooks to overlap adjacent rods, a trip-bar adapted to bridge the trap and provided with downturned ends to engage the outer sides of said arms and hold them pressed inward with their hook terminals overlying said adjacent rods, and a fabric body stretched loosely over said trip bar and secured to said semicircular rods so as to fold or unfold as the rods swing together or apart.

In testimony whereof I affix my signature, in the presence of two witnesses.

JOHN MEYER.

Witnesses:
   H. C. RODGERS,
   G. Y. THORPE.